(12) United States Patent
Nishimura et al.

(10) Patent No.: US 10,807,648 B2
(45) Date of Patent: Oct. 20, 2020

(54) FRAME

(71) Applicant: FUTABA INDUSTRIAL CO., LTD., Okazaki-shi, Aichi (JP)

(72) Inventors: Ryuzo Nishimura, Okazaki (JP); Kenji Niwa, Okazaki (JP); Koichi Kanda, Okazaki (JP)

(73) Assignee: FUTABA INDUSTRIAL CO., LTD., Okazaki-Shi, Aichi (JP)

( * ) Notice: Subject to any disclaimer, the term of this patent is extended or adjusted under 35 U.S.C. 154(b) by 154 days.

(21) Appl. No.: 16/060,283

(22) PCT Filed: Jan. 22, 2016

(86) PCT No.: PCT/JP2016/051915
§ 371 (c)(1),
(2) Date: Jun. 7, 2018

(87) PCT Pub. No.: WO2017/126119
PCT Pub. Date: Jul. 27, 2017

(65) Prior Publication Data
US 2019/0002030 A1   Jan. 3, 2019

(51) Int. Cl.
*B62D 25/04* (2006.01)
*B23K 11/11* (2006.01)
(Continued)

(52) U.S. Cl.
CPC .......... *B62D 25/04* (2013.01); *B23K 11/0026* (2013.01); *B23K 11/11* (2013.01);
(Continued)

(58) Field of Classification Search
CPC .. B62D 29/007; B62D 25/04; B23K 11/0026; B23K 11/11; B23K 2103/04; B23K 2101/006
(Continued)

(56) References Cited

U.S. PATENT DOCUMENTS

| | | |
|---|---|---|
| 6,702,368 B1 | 3/2004 | Hanyu |
| 2008/0315628 A1* | 12/2008 | Obayashi ............... B62D 25/04 296/193.06 |

(Continued)

FOREIGN PATENT DOCUMENTS

| | | |
|---|---|---|
| JP | 2002070908 A | 3/2002 |
| JP | 2003205859 A | 7/2003 |

(Continued)

OTHER PUBLICATIONS

International Search Report for International Patent Application No. PCT/JP2016/051915 (Form PCT/ISA/210), dated Mar. 15, 2016 (3 pages including English translation).

(Continued)

*Primary Examiner* — Joseph D. Pape
*Assistant Examiner* — Dana D Ivey
(74) *Attorney, Agent, or Firm* — Withrow & Terranova, P.L.L.C.; Vincent K. Gustafson

(57) ABSTRACT

A frame member is a high-tensile steel member included in a frame. The frame is a part of a body structure of a body of an automobile. The frame member includes a plate-like attachment for abutting other member of the automobile. The attachment includes a welding part configured to be welded to the other member. The welding part is thinner than other parts of the attachment.

18 Claims, 2 Drawing Sheets

(51) Int. Cl.
  *B23K 11/00* (2006.01)
  *B62D 29/00* (2006.01)
  *B23K 103/04* (2006.01)
  *B23K 101/00* (2006.01)

(52) U.S. Cl.
  CPC ...... *B62D 29/007* (2013.01); *B23K 2101/006* (2018.08); *B23K 2103/04* (2018.08)

(58) Field of Classification Search
  USPC .................................................. 296/193.06
  See application file for complete search history.

(56) References Cited

U.S. PATENT DOCUMENTS

2011/0133515 A1    6/2011  Mori
2015/0360725 A1*  12/2015  Yoshida ............... B62D 21/157
                                                      296/203.01

FOREIGN PATENT DOCUMENTS

| JP | 2007014979 A | * | 1/2007 | ............ B21K 23/00 |
| JP | 2007014979 A | | 1/2007 | |
| JP | 2010018254 A | | 1/2010 | |
| JP | 2010254190 A | | 11/2010 | |
| JP | 2015071385 A | | 4/2015 | |

OTHER PUBLICATIONS

Written Opinion for International Patent Application No. PCT/JP2016/051915 (Form PCT/ISA/237), dated Mar. 15, 2016 (4 pages including English machine translation).
International Preliminary Report on Patentability for International Patent Application No. PCT/JP2016/051915, dated Aug. 2, 2018, 6 pages.
Notification of Reasons for Refusal for Japanese Patent Application No. 2017-562409, dated Oct. 9, 2018, 4 pages.
First Office Action for Chinese Patent Application No. 201680079116.6, dated Mar. 19, 2020, 15 pages including English translation.

* cited by examiner

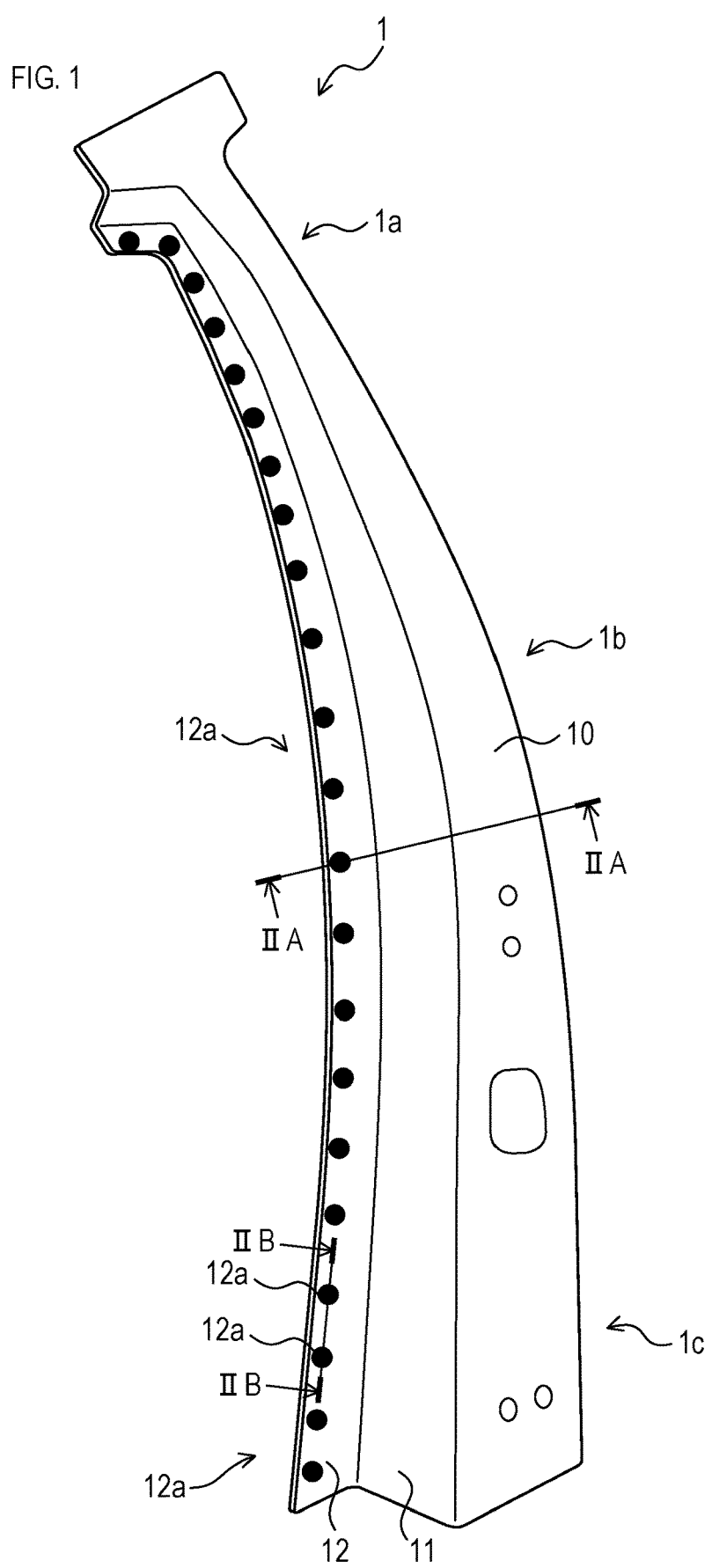

FRAME

CROSS-REFERENCE TO RELATED APPLICATION(S)

This application is a 35 U.S.C. § 371 national phase filing of International Application No. PCT/JP2016/051915 filed on Jan. 22, 2016, wherein the disclosure of the foregoing application is hereby incorporated by reference herein.

TECHNICAL FIELD

The present disclosure relates to a frame member included in a body structure of an automobile and so on.

BACKGROUND ART

To improve safety of automobiles, there has been a need for improved strength of main members for a body of an automobile, such as a center-pillar. Hollow center-pillars formed by layered members are already known. Such center-pillars are formed, for example, by welding rim-shaped flanges on the members to other members at several points by spot-welding. At the time of such welding, the heat from the spot-welding decreases the strength around the welded points on the flanges.

Meanwhile, Patent Document 1 discloses a flange that includes a portion with less strength in areas other than the welded points and around the welded points. The portion with less strength is thinner and weaker than other areas on the flange. Distortion by heat from the spot-welding is dispersed through the weaker portion, which helps to minimize the decrease in strength.

PRIOR ART DOCUMENTS

Patent Documents

Patent Document 1: Japanese Unexamined Patent Application Publication No. 2015-071385

SUMMARY OF THE INVENTION

Problems to be Solved by the Invention

In addition, strength of the center-pillar may also be improved by increasing thickness of constituent members of the center-pillar or other components, which however may cause difficulties in welding between each member.

Desirably, one aspect of the present disclosure improves strength of a body of an automobile while reducing the manufacturing cost.

Means for Solving the Problems

One aspect of the present disclosure relates to a frame member. The frame member is a high-tensile steel member included in a frame. The frame is a part of a body structure of a body of an automobile. The frame member comprises a plate-like attachment for abutting other member of the automobile. The attachment includes a welding part configured to be welded to the other member. The welding part is thinner than other parts of the attachment.

According to this configuration, the frame member can be easily and confidently joined with the other member by welding at the welding part. Areas of the frame member other than the welding part are thus allowed to be made thicker, which consequently enables improvement of the strength of the frame, including the frame member. The strength of the body of the automobile can therefore be improved.

In addition, increasing the thickness of the frame member can reduce the thickness of other member included in the frame and also eliminates a need for an additional reinforcement member, which then enables reduction of the number of components. This enables weight reduction of the body of the automobile. Also, such reduction of the number of components helps to decrease the number of welding points. The manufacturing cost of the automobile can therefore be reduced. Furthermore, the reduction of the number of components can help to avoid welding of a high-tensile steel frame member to other high-tensile steel member. As a consequence, risks after the high-tensile steel welding, such as delayed fractures that occur when the temperature at the welded point is decreased, can be reduced.

For the aforementioned reasons, the strength of the body of the automobile can be improved while reducing the manufacturing cost.

In the aforementioned configuration, the space inside the automobile for on-board passengers to stay may also be called a cabin. The frame member may be included in the frame that surrounds the cabin. The other member may be included in the frame that comprises the frame member.

Hence, the strength of body parts of the automobile that surround the cabin can be improved while reducing the manufacturing cost.

In the aforementioned configuration, the frame may be a center-pillar that is a pillar-shaped member located between two doors arranged alongside each other on a side of the automobile along a front-rear axis. The frame member may comprise a slender groove. The attachment may extend longitudinally along the groove.

Hence, the strength of the center-pillar can be improved while reducing the manufacturing cost.

One aspect of the present disclosure relates to a method of manufacturing a frame member. The frame member is a high-tensile steel member included in a frame. The frame is a part of a body structure of a body of an automobile. In this method of manufacturing, a plate-like member having a given shape is processed into a shape of the frame member by press molding. The frame member comprises a plate-like attachment configured for abutting other member of the automobile. The attachment comprises a welding part configured to be welded to the other member. The welded part is thinner than other part of the attachment. The welding part is formed when the plate-like member is processed into the shape of the frame member by press molding.

The frame member manufactured by such a method can be easily and confidently joined to the other member by welding at the welding part. Areas of the frame member other than the welding part are thus allowed to be made thicker, which consequently enables improvement of the strength of the frame, including the frame member. The strength of the body of the automobile can therefore be improved.

Increasing the thickness of the frame member can reduce the thickness of other member included in the frame and also eliminates a need for an additional reinforcement member, which then enables reduction of the number of components. This enables weight reduction of the body of the automobile. In addition, such reduction of the number of components helps to decrease the number of welding points. The manufacturing cost of the automobile can therefore be reduced. Furthermore, the reduction of the number of components can help to avoid welding of a high-tensile steel frame member to other high-tensile steel member. As a consequence, risks such as delayed fractures, which occur after the high-tensile steel welding when the temperature at the welded point is decreased, can be reduced.

Since the welding part is formed at the same time as forming other shapes on the frame member, the frame member can be efficiently processed into shape.

The strength of the body of the automobile can thus be improved while reducing the manufacturing cost.

In the aforementioned configuration, the space inside the automobile for on-board passengers to stay may also called a cabin. The frame member may be included in the frame that surrounds the cabin. The other member may be included in the frame that comprises the frame member.

Hence, the strength of body parts of the automobile that surround the cabin can be improved while reducing the manufacturing cost.

In the aforementioned configuration, the frame may be a center-pillar that is a pillar-shaped member located between two doors arranged alongside each other on a side of the automobile along a front-rear axis. The frame member may comprise a slender groove. The attachment may extend longitudinally along the groove.

Hence, the strength of the center-pillar can be improved while reducing the manufacturing cost.

BRIEF DESCRIPTION OF THE DRAWINGS

FIG. 1 is a perspective view of a center-pillar outer part according to one embodiment.

EXPLANATION OF REFERENCE NUMERALS

Figure 2A:
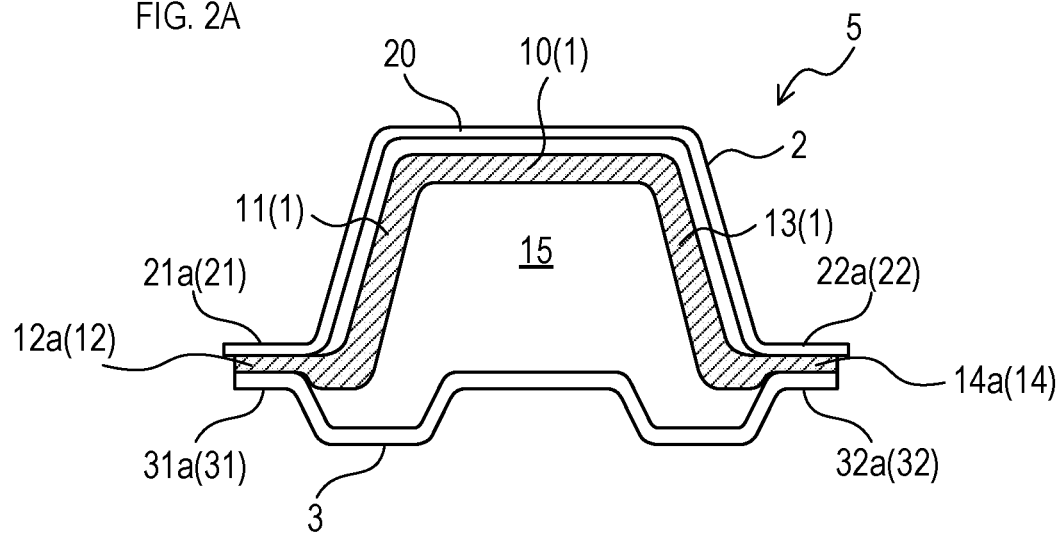
FIG. 2A is a sectional view of a center-pillar taken along the line IIA-IIA of FIG. 1; the center-pillar is formed with a center-pillar outer part, a side-member outer part, and a center-pillar inner part.

1 . . . center-pillar outer part, 2 . . . side-member outer part, 3 . . . center-pillar inner part, 10 . . . base, 11 . . . side wall, 12 . . . flange, 13 . . . side wall, 14 . . . flange, 15 . . . groove.

MODE FOR CARRYING OUT THE INVENTION

Hereinafter, embodiments of the present disclosure will be explained with reference to the drawings. The present disclosure will not be limited at all by the embodiments explained hereinafter and may be modified in various modes within the technical scope of the present disclosure.

[Explanation of Configuration]

A center-pillar is a frame of an automobile. A frame corresponds to a part of a body structure included in a body of an automobile. More specifically, the center-pillar is one of frames for surrounding a cabin (hereinafter referred to as frames-around-cabin) in the body structure of the body of the automobile. Thus the body structure of the body of the automobile corresponds to a framework of the body of the automobile. Members such as for forming an outer enclosure of the body of the automobile are attached to the body structure of the body of the automobile. The cabin is a space inside the automobile for on-board passengers of the automobile to stay. The cabin comprises a driver's seat for a driver, a passenger seat provided next to the driver, and a rear seat provided behind the driver's seat and the passenger seat.

The center-pillar is a pillar-shaped hollow member. One center-pillar is situated on each of the right and left sides of the automobile and located between a driver's seat door and a rear seat door or between a passenger seat door and a rear seat door. The center-pillar is covered by a rim of the door when the door is closed.

A center-pillar 5 is formed with layers of slender, plate-like members. Specifically, the center-pillar 5 comprises a center-pillar outer part 1, a side-member outer part 2, and a center-pillar inner part 3 (see, FIG. 1, 2A).

The center-pillar outer part 1 is made of high-tensile steel. Tensile strength of the high-tensile steel may be, for example, equal to or greater than 440 Mpa. The center-pillar outer part 1 may also be made of super high-tensile steel. Tensile strength of the super high-tensile steel may be, for example, equal to or greater than 980 Mpa.

The center-pillar outer part 1 is a slender, groove-shaped member. The center-pillar outer part 1 comprises a groove 15 that extends longitudinally. The center-pillar outer part 1 is tapered toward its one longitudinal end (hereinafter, referred to as upper end). In other words, the width of the groove 15 is reduced towards the upper end of the center-pillar outer part 1. In addition, the depth of the groove 15 is also reduced towards the upper end of the center-pillar outer part 1.

An upper area 1a, which includes the upper end of the center-pillar outer part 1, and a lower area 1c, which includes a lower end of the center-pillar outer part 1, have less strength than a center area 1b situated between the upper area 1a and the lower area 1c. More specifically, the upper area 1a and the lower area 1c may be made thinner than the center area 1b to adjust the strength of these three areas. The strength of the center-pillar outer part 1 is adjusted as described above, so that deformation of the center-pillar 5 is reduced when the automobile is involved in side impacts.

Figure 2B:
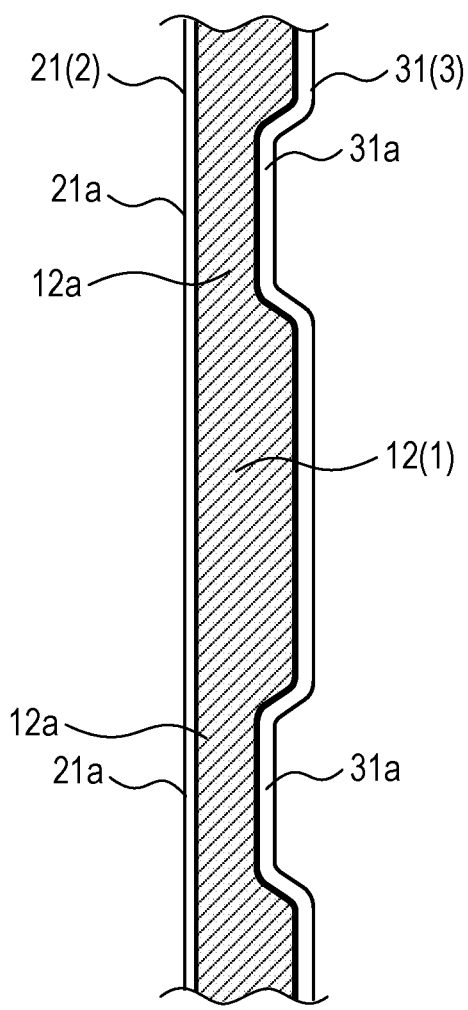
FIG. 2B is a sectional view of the center-pillar taken along the line IIB-IIB of FIG. 1; the center-pillar is formed with the center-pillar outer part, the side-member outer part, and the center-pillar inner part.

The center-pillar outer part 1 comprises a slender, belt-shaped base 10 and two side walls 11 and 13 (see, FIGS. 2A and 2B). The side walls 11 and 13 are respectively located on one and the other longitudinally-extending end portions of the base 10. The side walls 11 and 13 are wall members protruding from these end portions to the same direction. The groove 15 is a space surrounded by the base 10, the side wall 11, and the side wall 13. In addition, the center-pillar outer part 1 also comprises two slender, plate-like flanges 12 and 14 extending longitudinally along an opening of the groove 15. More specifically, the flanges 12 and 14 are situated respectively adjacent to one and the other longitudinally-extending end portions of the opening of the groove 15. The flanges 12 and 14 are plate-like members protruding outwardly respectively from the end portions of the side walls 11 and 13 at the opening of the groove 15.

The flanges 12 and 14 respectively comprise welding parts 12a and welding parts 14a. The welding parts 12a, and likewise the welding parts 14a, are arranged in a line along the longitudinal axis at a predetermined interval. The welding parts 12a and 14a are dot-shaped areas. The welding parts 12a and 14a are made thinner than other areas of the flanges 12 and 14. The welding parts 12a and 14a are also made thinner than the side walls 11 and 13, and the base 10. In other words, the welding parts 12a and 14a are depressions respectively formed on surfaces of the flanges 12 and 14 that face the same side as the opening of the groove 15 does. Contrary to this configuration, the welding parts 12a and 14a may be depressions respectively formed on surfaces of the flanges 12 and 14 that are closer to the base 10 of the groove 15.

As one example, the welding parts 12a and 14a are formed into circles. Nevertheless, the welding parts 12a and 14a may be formed into, for example, ellipses or polygonal shapes without being limited to circles. The welding parts 12a and 14a may also be formed into, for example, a shape that includes a curved outer edge and a straight outer edge. Specifically, the welding parts 12a and 14a may be formed into, for example, semicircular shapes. The welding parts 12a and 14a may also be formed into, for example, a shape with an outer edge that includes a U-shaped portion and a straight line for connecting both ends of the U-shaped portion. It is also anticipated that the welding parts 12a and 14a are, for example, located respectively adjacent to longitudinally-extending end portions of the flanges 12 and 14. The longitudinally-extending end portions of the flanges 12 and 14 may be at the far side from the groove 15. In this case, the welding parts 12a and 14a may include in their outer edges that are not adjacent to the longitudinally-extending end portions of the flanges 12 and 14, for example, a curved line (e.g., semicircular or U-shaped line) or a polygonal line.

Meanwhile, the side-member outer part 2 is a slender, groove-shaped member. The side-member outer part 2 comprises a slender groove 20 that extends along the longitudinal axis of the side-member outer part 2. The side-member outer part 2 comprises two outer joining parts 21 and 22. The outer joining parts 21 and 22 are slender, plate-like members that extend longitudinally along an opening of the groove 20. The outer joining parts 21 and 22 are respectively located adjacent to one and the other longitudinally-extending end portions of the opening of the groove 20.

The center-pillar inner part 3 is a slender, plate-like member. The center-pillar inner part 3 comprises two inner joining parts 31 and 32. The inner joining parts 31 and 32 are respectively located on one and the other longitudinally-extending end portions of the center-pillar inner part 3. The inner joining parts 31 and 32 are slender, plate-like members that extend along the longitudinal axis of the center-pillar inner part 3. The inner joining parts 31 and 32 respectively comprise projections 31a and projections 32a. The projections 31a, and likewise the projections 32a, are arranged in a line along the longitudinal axis. The projections 31a and the projections 32a can be fitted to the welding parts 12a and 14a of the flanges 12 and 14.

The center-pillar 5 is formed by layering and joining the center-pillar outer part 1, the side-member outer part 2, and the center-pillar inner part 3.

When forming the center-pillar 5, the center-pillar outer part 1 is interposed between the side-member outer part 2 and the center-pillar inner part 3. The opening of the groove 15 in the center-pillar outer part 1 is covered with the center-pillar inner part 3. The base 10, and the side walls 11 and 13 of the center-pillar outer part 1 are covered with the side-member outer part 2 from the exterior side of the groove 15. In other words, the base 10, and the side walls 11 and 13 of the center-pillar outer part 1 are housed in the groove 20 of the side-member outer part 2.

Also in this process, the flanges 12 and 14 of the center-pillar outer part 1 abut, at their surfaces that are closer to the base 10, the outer joining parts 21 and 22 of the side-member outer part 2. The flanges 12 and 14 also abut, at their surfaces that face the same side as the opening of the groove 15 does, the inner joining parts 31 and 32 of the center-pillar inner part 3. The welding parts 12a of the flange 12 fit to the projections 31a of the inner joining part 31 of the center-pillar inner part 3. The welding parts 14a of the flange 14 fit to the projections 32a of the inner joining part 32 of the center-pillar inner part 3.

The welding parts 12a and 14a of the flanges 12 and 14, the projections 31a and 32a of the center-pillar inner part 3, and abutting portions 21a and 22a of the side-member outer part 2 are welded by spot-welding. The abutting portions 21a and 22a are parts of the outer joining parts 21 and 22 of the side-member outer part 2 and configured for abutting the welding parts 12a and 14a.

The thickness of the welding parts 12a and 14a are adjusted to sufficiently join the welding parts 12a and 14a with the abutting portions 21a and 22a of the side-member outer part 2 and the projections 31a and 32a of the center-pillar inner part 3 when these three are welded by spot-welding. In other words, the thickness of the welding parts 12a and 14a are determined depending on thicknesses of the abutting portions 21a and 22a, and the projections 31a and 32a. In addition, the size of the welding parts 12a and 14a may also be adjusted to sufficiently join the welding parts 12a and 14a with the abutting portions 21a and 22a and the projections 31a and 32a when they are welded by spot-welding.

The center-pillar outer part 1 may comprise an attachment. The attachment may be a plate-like member configured for abutting other member that is not included in the center-pillar 5. The attachment may comprise a welding part similar to the welding parts on the flanges 12 and 14. Also similar to the flanges 12 and 14, the attachment may be welded to other member at the welding part by spot-welding.

The flanges 12 and 14 may be joined to the side-member outer part 2 and the center-pillar inner part 3 by a welding method other than spot-welding. Preferably, in such a case, shapes and other details of the welding parts 12a and 14a are determined depending on the welding method.

The flanges 12 and 14 may be configured to abut one of the side-member outer part 2 or the center-pillar inner part 3. The center-pillar outer part 1 may thus be welded to one of the side-member outer part 2 or the center-pillar inner part 3 by spot-welding at the welding parts. If the center-pillar outer part 1 is welded to the side-member outer part 2 as mentioned above, the side-member outer part 2 preferably comprises projections similar to the projections of the center-pillar inner part 3.

As the frames-around-cabin, an automobile comprises members other than the center-pillar 5, for example, a kick reinforcement, a dashboard lower cross-member, a lower front pillar, and a front pillar upper-reinforcement.

The kick reinforcement is located below the driver's seat and the passenger seat. The kick reinforcement is a slender member extending in a front-rear direction of the automobile.

The dashboard lower cross-member is situated in front of the driver's seat and the passenger seat along the base part of the cabin. The dashboard lower cross-member is a slender member extending along the width of the automobile. A front end of the kick reinforcement is attached to the dashboard lower cross-member.

The lower front pillar is a pillar-shaped member situated in a front side of each of the driver's seat door and the passenger seat door. The lower front pillar extends from the base part of the cabin to a lower end of a front windshield.

The front pillar upper-reinforcement is located in an upper side of the lower front pillar. The front pillar upper-reinforcement is a slender member extending along a side edge area of the front windshield.

Hereinafter, a high-tensile steel members included in the frame will be referred to as a frame member. The frame member included in the frames-around-cabin, other than the center-pillar 5, may comprise a welding part similar to the welding parts of the center-pillar outer part 1. In addition to and without limiting to the frames-around-cabin, the frame member included in any of the frames in the entire automobile body structure may also comprise a welding part similar to the welding parts of the center-pillar outer part 1.

In other words, the frame member made of high-tensile steel or super high-tensile steel may comprise the attachment. The attachment is a plate-like part configured for abutting other member when the frame member is joined with the other member. The other member may be those included in the same frame that comprises the frame member, or those that is not included in the same frame. The attachment comprises a welding part similar to the welding part of the center-pillar outer part 1. Similar to the center-pillar 5, the attachment may be welded to other member by spot-welding at the welding part.

The attachment of the frame member may be welded to other member by a welding method other than spot-welding. Preferably, in such a case, shapes and other details of the welding part arranged on the attachment are determined depending on the welding method.

[Explanation of Manufacturing Method]

A method of manufacturing the center-pillar outer part 1 according to the present embodiment will be explained next. The center-pillar outer part 1 is processed into a predetermined shape by hot stamping (hot pressing) on a plate-like steel material. Application of hot stamping turns the steel material for the center-pillar outer part 1 into a high-tensile steel or super high-tensile steel.

Firstly, the plate-like steel material is cut into a predetermined shape and made into a plate-like member (cutting step). The plate-like member may have a uniform thickness.

The plate-like member is then heated to a predetermined heating temperature (for example, 900° C.) in a heating furnace (heating step).

The plate-like member, heated to the heating temperature, then undergoes a press molding process in a hot stamping machine using a predetermined mold (molding step). The center-pillar outer part 1 is processed into a predetermined shape in this step. The welding parts 12*a* and 14*a* are also formed in this step. In other words, the welding parts 12*a* and 14*a* are formed at the same time as forming other parts of the center-pillar outer part 1, such as the groove 15 and the flanges 12 and 14. The plate thickness of the welding parts 12*a* and parts 14*a* can thus be made thin.

The center-pillar outer part 1 molded in the molding step is then quickly cooled in the hot stamping machine (cooling step). The steel material for the center-pillar outer part 1 is hardened and turned into a high-tensile steel or super high-tensile steel in this step.

[Effects]

The center-pillar outer part 1 according to the present embodiment can be easily and confidently joined with the side-member outer part 2 and the center-pillar inner part 3 by applying spot-welding on the welding parts 12*a* and the welding parts 14*a*. Areas of the center-pillar outer part 1 other than the welding parts 12*a* and 14*a* are thus allowed to be made relatively thick. This enables improvement of the strength of the center-pillar outer part 1 and thus of the strength of the center-pillar 5.

Increasing the thickness of the center-pillar outer part 1 can reduce thickness of other member included in the center-pillar 5 and also eliminates a need for an additional reinforcement member in the center-pillar 5, which then enables reduction of the number of components. This enables weight reduction of the body of the automobile. In addition, such reduction of the number of components helps to decrease the number of welding points. The manufacturing cost of an automobile can therefore be reduced. Furthermore, the reduction of the number of components can help to avoid welding of a high-tensile steel center-pillar outer part 1 to other high-tensile steel member. As a consequence, risks after the high-tensile steel welding, such as delayed fractures that occur when the temperature at the welded point is decreased, can be reduced.

According to the method of manufacturing in the present embodiment, the welding parts 12*a* and 14*a* of the center-pillar outer part 1 are formed at the same time as forming the groove 15 and the flanges 12 and 14 of the center-pillar outer part 1. The center-pillar outer part 1 can therefore be efficiently processed into shape.

For these reasons, the strength of the body of the automobile can be improved while reducing the manufacturing cost.

In addition, the center-pillar inner part 3 is located in the inner side of the center-pillar 5, which is the interior side of the automobile. The center-pillar inner part 3 is usually unseen by the user. The welding parts 12*a* and 14*a* of the center-pillar outer part 1 are located respectively on the surfaces of the flanges 12 and 14 facing the same side as the opening of the groove 15 is. The center-pillar inner part 3 comprises the projections 31*a* and 32*a* that respectively fit to the welding parts 12*a* and 14*a*. In other words, depressions and projections for welding are located in an area unseen by the user. This enables improvement of the strength of the body of the automobile without damaging its appearance.

[Other Embodiments]

(1) In the present embodiment, the center-pillar outer part 1 is manufactured by hot stamping. Nevertheless, the center-pillar outer part 1 may also be manufactured by cold pressing. More specifically, the shape of the center-pillar outer part 1 may be formed first by a press molding process in the molding step; the center-pillar outer part 1 formed in the molding step may then be heated and cooled (quenched). This may also be a method used to turn the steel material that forms the center-pillar outer part 1 into a high-tensile steel or super high-tensile steel.

(2) In the present embodiment, the frame member, such as the center-pillar outer part 1, included in the frames of the body of the automobile is joined with other member by welding at the joining area located in the frame member. Nevertheless, the frame member may be joined with other member by swaging at the welding part.

[Terms Corresponding to Claims]

The terms used to explain the aforementioned embodiments correspond to the terms used in the claims as below.

The center-pillar outer part 1 corresponds to an example of the frame member. The side-member outer part 2 and the center-pillar inner part 3 correspond to an example of the other member. The flanges 12 and 14 correspond to an example of the attachment.

The invention claimed is:

1. A frame being a part of a body of an automobile, the frame including a first member and a frame member made of high-tensile steel,
  wherein the frame member comprises:
    a flange that is plate-like and is in surface contact with the first member; and welding parts comprising depressions formed in the flange, wherein a thickness of the flange at the welding parts is thinner than an area of the flange around the welding parts, wherein the first member comprises:

a first joining part being a plate-like member and arranged in surface contact with the flange; and projections located at the first joining part, the projections protruding from one surface of the first joining part, and being formed as depressions on another surface of the first joining part, and wherein the projections are fitted to the welding parts, and the projections are welded to the welding parts.

2. The frame according to claim 1 wherein the frame member comprises a slender groove, and wherein the flange extends along the slender groove.

3. The frame according to claim 2, wherein the first member is disposed so as to cover the slender groove of the frame member.

4. The frame according to claim 3, wherein:

a cabin is a space inside the automobile configured to contain on-board passengers of the automobile, and the frame is included in a portion of the body that surrounds the cabin of the automobile.

5. The frame according to claim 4, wherein the frame is a center-pillar that is a pillar-shaped member located between two doors arranged alongside each other on a side of the automobile along a front-rear axis.

6. The frame according to claim 2, wherein:

a cabin is a space inside the automobile configured to contain on-board passengers of the automobile, and the frame is included in a portion of the body that surrounds the cabin of the automobile.

7. The frame according to claim 6, wherein the frame is a center-pillar that is a pillar-shaped member located between two doors arranged alongside each other on a side of the automobile along a front-rear axis.

8. The frame according to claim 1, wherein:

the frame further comprises a second member;

the second member is a plate-like member that is in surface contact with the flange, and comprises a second joining part to interpose the flange between the second joining part and the first joining part, and the welding parts, the projections that are fitted to the welding parts, and areas of the second joining part that are in surface contact with the welding parts, are welded.

9. The frame according to claim 8, wherein:

the frame member comprises a slender groove, and the flange extends along the slender groove.

10. The frame according to claim 9, wherein:

the first member is disposed so as to cover the slender groove of the frame member, and the second member is disposed so as to cover an other side of the slender groove of the frame member.

11. The frame according to claim 10, wherein:

a cabin is a space inside the automobile configured to contain on-board passengers of the automobile, and the frame is included in a portion of the body that surrounds the cabin of the automobile.

12. The frame according to claim 11, wherein the frame is a center-pillar that is a pillar-shaped member located between two doors arranged alongside each other on a side of the automobile along a front-rear axis.

13. The frame according to claim 9, wherein:

a cabin is a space inside the automobile configured to contain on-board passengers of the automobile, and the frame is included in a portion of the body that surrounds the cabin of the automobile.

14. The frame according to claim 13, wherein the frame is a center-pillar that is a pillar-shaped member located between two doors arranged alongside each other on a side of the automobile along a front-rear axis.

15. The frame according to claim 8, wherein:

a cabin is a space inside the automobile configured to contain on-board passengers of the automobile, and the frame is included in a portion of the body that surrounds the cabin of the automobile.

16. The frame according to claim 15, wherein the frame is a center-pillar that is a pillar-shaped member located between two doors arranged alongside each other on a side of the automobile along a front-rear axis.

17. The frame according to claim 1, wherein:

a cabin is a space inside the automobile configured to contain on-board passengers of the automobile, and the frame is included in a portion of the body that surrounds the cabin of the automobile.

18. The frame according to claim 17, wherein the frame is a center-pillar that is a pillar-shaped member located between two doors arranged alongside each other on a side of the automobile along a front-rear axis.

* * * * *